(12) United States Patent
Kudo et al.

(10) Patent No.: US 12,316,127 B2
(45) Date of Patent: May 27, 2025

(54) POWER CONVERSION DEVICE

(71) Applicants: KABUSHIKI KAISHA TOSHIBA, Tokyo (JP); Toshiba Energy Systems & Solutions Corporation, Kawasaki (JP)

(72) Inventors: Yuki Kudo, Tokyo (JP); Koji Toba, Tokyo (JP); Shunsuke Kawachi, Tokyo (JP); Yukina Akiyama, Kawasaki Kanagawa (JP); Takahiro Kase, Kawasaki Kanagawa (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 362 days.

(21) Appl. No.: 17/905,149

(22) PCT Filed: Jan. 7, 2021

(86) PCT No.: PCT/JP2021/000408
§ 371 (c)(1),
(2) Date: Aug. 26, 2022

(87) PCT Pub. No.: WO2021/205701
PCT Pub. Date: Oct. 14, 2021

(65) Prior Publication Data
US 2023/0089057 A1    Mar. 23, 2023

(30) Foreign Application Priority Data
Apr. 10, 2020 (JP) .................... 2020-070971

(51) Int. Cl.
*H02J 3/48* (2006.01)
*H02J 9/06* (2006.01)
(Continued)

(52) U.S. Cl.
CPC ............... *H02J 3/48* (2013.01); *H02J 9/062* (2013.01); *H02M 7/48* (2013.01); *H02J 3/381* (2013.01); *H02J 2300/20* (2020.01)

(58) Field of Classification Search
CPC .......... H02J 3/48; H02J 9/062; H02J 2300/20; H02J 3/381; H02M 7/48
See application file for complete search history.

(56) References Cited

U.S. PATENT DOCUMENTS 9,356,448 B2    5/2016   Sugimoto et al.
2013/0027993 A1    1/2013   Tan et al.
(Continued)

FOREIGN PATENT DOCUMENTS

JP    2007-318833 A    12/2007
JP    4846450 B2    12/2011
(Continued)

OTHER PUBLICATIONS

Japan Patent Office, International Search Report issued in International Application No. PCT/JP2021/000408 (Mar. 16, 2021), 2 pages, and English translation, 2 pages.

*Primary Examiner* — Vincent H Tran
(74) *Attorney, Agent, or Firm* — Finnegan, Henderson, Farabow, Garrett & Dunner, LLP

(57) ABSTRACT

Provided is a power converter capable of reducing cross current. The power converter 1 includes a phase controller 20 that calculate a phase angle reference value θm based on a difference between a commanded active power reference value Pe and an output active power P supplied to a distribution line 5, a voltage controller 10 that calculates a voltage reference values Vu, Vv, and Vw based on the phase angle reference value θm calculated by the phase controller 20, and a power conversion unit 52 that converts, based on the voltage reference values Vu, Vv, and Vw calculated by (Continued)

the voltage controller 10, an electric power supplied from a power supply source 60 into AC power and outputs it to the distribution line 5.

4 Claims, 15 Drawing Sheets

(51) Int. Cl.
*H02M 7/48* (2007.01)
*H02J 3/38* (2006.01)

(56) References Cited

U.S. PATENT DOCUMENTS

| | | | | |
|---|---|---|---|---|
| 2015/0357820 A1* | 12/2015 | Sugimoto | ............... | H02M 7/04 |
| | | | | 307/52 |
| 2015/0357822 A1* | 12/2015 | Yokokawa | ............... | H02J 3/40 |
| | | | | 307/51 |
| 2019/0265663 A1* | 8/2019 | Harnefors | ............... | H02J 3/34 |
| 2019/0334352 A1 | 10/2019 | Sugimoto et al. | | |
| 2021/0320498 A1* | 10/2021 | Yamaguchi | ............... | H02M 7/48 |
| 2023/0050448 A1* | 2/2023 | Ebrahimzadehveshareh | ............... | |
| | | | | F03D 7/0272 |

FOREIGN PATENT DOCUMENTS

| | | | |
|---|---|---|---|
| JP | 2013-39026 A | 2/2013 | |
| JP | 5956991 B2 | 7/2016 | |
| JP | 2018-107991 A | 7/2018 | |

* cited by examiner (a) Voltage controller 10

(b) Phase controller 20

(a) Voltage ontroller 10

(b) Phase controller 20

(a) Voltage controller 10

(b) Phase controller 30

(a) Voltage controller 10

(b) Phase controller 20

POWER CONVERSION DEVICE

CROSS-REFERENCE TO RELATED APPLICATION

This is a National Phase Entry of International Application No. PCT/JP2021/000408, filed Jan. 7, 2021, and published as WO 2021/205701 A1, which claims the benefit of priority to Japanese Application No. JP 2020-070971, filed Apr. 10, 2020, the contents of which are incorporated herein by reference in their entireties.

FIELD

The present embodiments relate to a power converter that converts electric power supplied from a power supply source into the AC power.

BACKGROUND

In recent years, the installation of islanded microgrid systems has been promoted. Such a microgrid system is composed of renewable energy power generation devices such as solar power generation devices and wind power generation devices, or inverter-based power sources using a storage battery. In the inverter-based power source, the electric power output from solar power generation, wind power generation, storage battery or the like is converted into alternating current power by a power converter such as an inverter using power electronics technology. The AC power converted by the power converter is supplied to a microgrid system. The power converter used for an inverter-based power source in such a microgrid system is known.

CITATION LIST

Patent Literature

[Patent Literature 1]
  Japanese Patent Laid-Open No.2007-318833
[Patent Literature 2]
  Japanese Patent No. 4846450

SUMMARY

The microgrid system is interconnected to the utility grid. The microgrid system independently supplies power to consumers even when the power supply from the utility grid is stopped.

When the microgrid system independently performs power supply, it is difficult to maintain the system frequency and voltage by applying the grid-following type control, which is the control type normally used for the inverter-based power source. When the microgrid system independently performs power supply, the power converter may be controlled by VSG (virtual synchronous generator) control. The VSG control causes the power converter to simulate an operation of the synchronous generator, and maintains the system frequency and voltage in the same manner as a normal synchronous generator.

However, when a plurality of power converters in the microgrid system are controlled by the VSG control, an event called cross current may occur, in which active power is oscillatory transferred between the power converters. The cross current occurs when power converters fluctuate their output power significantly due to load fluctuations or the like, because each power converter simultaneously controls the frequency in accordance with the respective difference between the active power reference value and output active power value.

The VSG control consists of two controls: voltage control and phase control. The voltage control is a control uses an AVR (automatic voltage regulator) to match the output voltage with a reference value. The phase control is a control calculates a virtual machine angle phase based on a swing equation. In detail, the difference between the active power reference value and the output active power value is added to the fundamental angular frequency via the first-order lag to obtain the virtual machine angular frequency, and the virtual machine angle phase is calculated by integrating the virtual machine angular frequency. The three-phase voltage reference value with respect to the output power is calculated from the voltage reference value and the virtual machine angle phase calculated by the two controls of the voltage control and the phase control.

When a plurality of power converters in the microgrid system are controlled by the VSG control, each power converter controls the output power by adjusting the virtual machine angle phase. When it is necessary to suddenly fluctuate the output power of a plurality of power converters due to load fluctuations or the like, each power conversion device controls the output active power by adjusting the respective virtual machine angular frequency.

When there is a plurality of the power converters, they compensate the excess or deficiency in frequency adjustment each other. However, due to the first-order lag, oscillation occurs for a certain period of time until the adjustment between the power converters becomes stable. This causes the cross current. Each power converter operates and stabilizes at the same frequency after the certain period of time. There is a problem that the cross current between power converters increases a required capacity of the power converter.

In view of the above problem, it is an object of the present embodiments to provide a power converter capable of reducing the cross current.

Solution to the Problems

A power converter of the present embodiments includes the following structure.
(1) a phase controller calculating a phase angle reference value based on a difference between an active power reference value and an output active power supplied to a distribution line.
(2) a voltage controller calculating a voltage reference value based on the phase angle reference value calculated by the phase controller.
(3) a power conversion unit converting, based on the voltage reference value calculated by the voltage controller, an electric power supplied from a power supply source into AC power and outputs it to the distribution line.

DETAILED DESCRIPTION

Hereinafter, the power converter 1 and the power conversion system 100 according to the embodiment of the present disclosure will be described with reference to the drawings. It should be noted that the embodiments shown below are merely examples and are not construed as being limited to these embodiments. In the present embodiments, when there are a plurality of devices and members with the same configuration, they will be described with the same number. In addition, when explaining each of the individual devices and members with the same configuration, the common numbers are distinguished by adding an alphabetic (lowercase) subscript.

1. First Embodiment

[1-1. Configuration]

Figure 1:
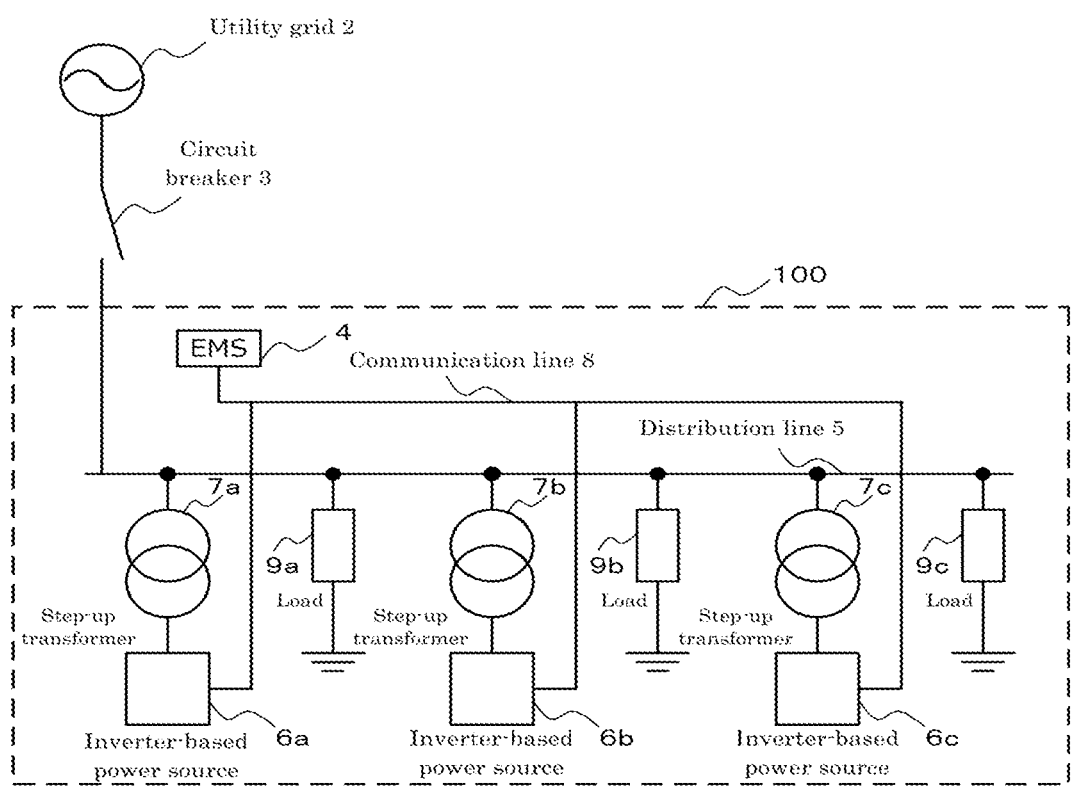
FIG. 1 is a diagram illustrating a structure of the power conversion system according to a first embodiment.

The power converter 1 and the power conversion system 100 as an example of the present embodiment will be described with reference to the FIGS. 1 to 3. The power conversion system 100 includes a plurality of inverter-based power sources 6, a step-up transformer 7, and an EMS (Energy Management System) 4. As an example, the power conversion system 100 has three inverter-based power-sources 6a, 6b, and 6c. The inverter-based power sources 6a, 6b, and 6c are connected to a distribution line 5 via the step-up transformers 7a, 7b, and 7c, respectively. A load 9 is connected to the distribution line 5.

The distribution line 5 is connected to an utility grid 2 via a circuit breaker 3. The utility grid 2 supplies the electric power generated by power generation facilities such as the thermal power plant, the hydraulic power plant, and the nuclear power plant to the distribution line 5. The distribution line 5 performs power supply to the load 9. The electric power is supplied from the utility grid 2 or the inverter-based power sources 6a, 6b, and 6c to the loads 9a, 9b, and 9c via the distribution line 5. The power conversion system 100 may be configured by an arbitrary quantity of the inverter-based power sources 6a to 6n. Further, the distribution line 5 may be connected to an arbitrary quantity of loads 9a to 9n.

The inverter-based power source 6 includes a power converter 1 described later. The inverter-based power sources 6a, 6b, and 6c include the power converters 1a, 1b, and 1c, respectively. The power converters 1a, 1b, and 1c are connected to the EMS 4 via a communication line 8. The power converters 1a, 1b, and 1c control an output active power P based on an active power reference value Pe commanded by the EMS 4.

(Inverter-Based Power Source 6)

Figure 2:
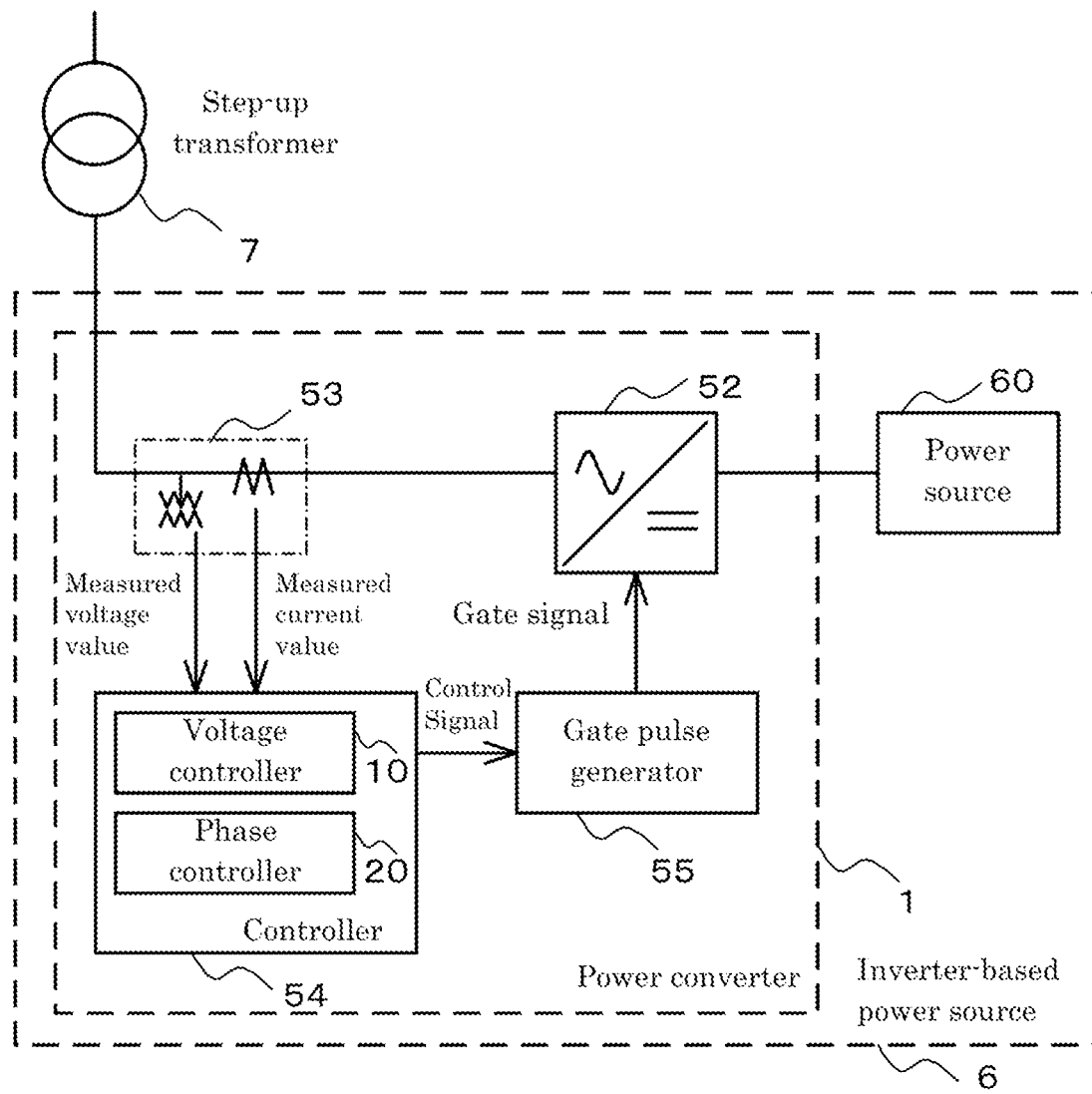
FIG. 2 is a diagram illustrating a structure of the power converter according to the first embodiment.

FIG. 2 illustrates the configuration of the inverter-based power source 6. The inverter-based power source 6 includes the power converter 1 and a power source 60. The inverter-based power sources 6a, 6b, and 6c have a similar configuration.

The power source 60 is composed of a renewable energy power source such as a solar power generation facility and a wind power generation facility. The power source 60 generates DC power and supplies it to the power converter 1. Further, the power source 60 may be configured by a storage battery. The power source 60 composed of the storage battery is charged by converting the AC power of the distribution line 5 into the DC power by the power converter 1. The power source 60 which is the storage battery generates the DC power and supplies it to the power converter 1.

(Power Converter 1)

The power converter 1 is connected to the step-up transformer 7 and the power source 60. The power converter 1 converts the DC power output from the power source 60 into the AC power and supplies it to the distribution line 5 via the step-up transformer 7. The power converter 1 includes a power conversion unit 52, a voltage current meter 53, a controller 54, and a gate pulse generator 55. The power converter 1 may have an interconnection reactor or a harmonic filter between the power conversion unit 52 and the step-up transformer 7.

The power conversion unit 52 is composed of a semiconductor switch such as a field effect transistor (FET). The power conversion unit 52 is connected to the power source 60 and the step-up transformer 7. The power conversion unit 52 is controlled by the gate pulse generator 55. The power conversion unit 52 converts the DC power output from the power source 60 into the AC power and supplies it to the distribution line 5 via the step-up transformer 7. When the power source 60 is composed of the storage battery, the power conversion unit 52 converts the AC power of the distribution line 5 into DC power and supplies it to the power source 60. The DC power converted by the power conversion unit 52 is stored in the power source 60.

The voltage current meter 53 is composed of a measuring transformer, a measuring current transformer, and the like. The voltage current meter 53 is arranged at the interconnection point between the power conversion unit 52 and the step-up transformer 7 or the distribution line 5, and is connected to the controller 54. The voltage current meter 53 measures the voltage and current at the interconnection point between the power converter 1 and the step-up transformer 7 or the distribution line 5. The voltage current meter 53 measures the voltage amplitude, the frequency, and the phase to obtain the measured voltage value Vs, and measures the current amplitude, the frequency, and the phase to obtain the current measured value Is. The voltage current meter 53 outputs the measured voltage value Vs and the measured current value Is to the controller 54.

The controller 54 is configured by a hardware-based circuit, a microcomputer, or the like. The controller 54 is connected to the voltage current meter 53 and the gate pulse generator 55. The control unit 54 creates a control signal based on the measured voltage value Vs and the measured current value Is output from the voltage current meter 53, and outputs the control signal to the gate pulse generator 55. The control signal is a signal that controls the gate pulse generator 55, and is a sine-wave voltage waveform. The control signal is composed of three-phase voltage reference values Vu, Vv, and Vw. The voltage amplitude, the frequency, and the phase are commanded by the control signal. The control signal may command the voltage amplitude, the frequency, and the phase by telegram.

The gate pulse generator 55 is configured by a hardware-based circuit, a microcomputer, or the like. The gate pulse generator 55 is connected to the controller 54 and the power conversion unit 52. The gate pulse generator 55 generates a gate signal based on the voltage amplitude, the frequency, and the phase applied to the control signal received from the controller 54, and outputs it to the power conversion unit 52. The gate signal is a signal that modulates the output voltage waveform of the power conversion unit 52, and is, for example, a pulse width modulation (PWM modulation) signal that controls On/Off of the semiconductor switch of the power conversion unit 52. The power conversion unit 52 converts, by the voltage amplitude, the frequency, and the phase controlled by the gate pulse generator 55, the DC power output from the power source 60 into the AC power and supplies it to the distribution line 5 via the step-up transformer 7.

(Configuration of Controller 54)

The controller 54 is composed of a voltage controller 10 and a phase controller 20.

The phase controller 20 is composed of the control block shown in FIG. 3B. The phase controller 20 includes a subtracter 21, a first-order lag controller 22, an adder 23, an integrator 24, and a proportional controller 25. The subtracter 21, the first-order lag controller 22, the adder 23, and the integrator 24 of the phase controller 20 are connected in series in this order. The proportional controller 25 is connected in parallel to the first-order lag controller 22. The control amount output from the proportional controller 25 is added to the control amount output from the first-order lag controller 22 at the adder 23.

The active power reference value Pe is input to the subtracter 21 of the phase controller 20. The active power reference value Pe is transmitted from the EMS 4. Further, the output active power P with respect to the electric power output from the power converter 1 is input to the subtracter 21. The output active power P is calculated by the controller 54 based on the measured voltage value Vs, the measured current value Is, and the phase angle θs measured by the voltage current meter 53.

The fundamental angular frequency ω0 and the control amount output from the proportional controller 25 are input to the adder 23. The fundamental angular frequency ωo may be transmitted from the EMS 4 or may be preset and held by the phase controller 20.

The subtracter 21 subtracts the output active power P from the active power reference value Pe. Based on the difference between the active power reference value Pe and the output active power P subtracted by the subtracter 21, the first-order lag controller 22 calculates the control amount for the first-order lag process. On the other hand, based on the difference between the active power reference value Pe and the output active power P subtracted by the subtracter 21, the proportional controller 25 calculates the control amount for the proportional control. After that, the control amount calculated by the first-order lag controller 22, the control amount calculated by the proportional controller 25, and the fundamental angular frequency ω0 are added by the adder 23 and converted into the phase angle reference value θm by the integrator 34.

The voltage controller 10 is composed of the control block shown in FIG. 3A. The voltage controller 10 is composed of a subtracter 11, a first-order lag controller 12, a PI controller 13, a dq/abc converter 14, and an abc/dq converter 15. The subtracter 11, the first-order lag controller 12, the PI controller 13, and the dq/abc converter 14 of the voltage controller 10 are connected in series in this order. The abc/dq converter 15 is connected to the subtracter 11. The voltage controller 10 may not have the first-order lag controller 12.

The measured voltage value Vs measured by the voltage current meter 53 is input to the abc/dq converter 15 of the voltage controller 10. The measured voltage value Vs is measured by the voltage current meter 53 and transmitted. Further, the phase angle reference value θm is input to the abc/dq converter 15. The phase angle reference value θm is calculated by the phase controller 20. The voltage command value V0 is input to the subtracter 11. The voltage command value V0 may be transmitted from the EMS 4 or may be preset and held by the voltage controller 10. The phase angle reference value θm is input to the dq/abc converter 14.

The measured voltage value Vs is converted into a d-axis voltage Vsd by the abc/dq converter 15. The subtracter 11 subtracts the d-axis voltage Vsd from the voltage command value V0. Based on the difference between the voltage command value V0 and the d-axis voltage Vsd subtracted by the subtracter 11, the first-order lag controller 12 calculates the control amount for the first-order lag process. After that, the control amount calculated by the first-order lag controller 12 is PI controlled by the PI controller 13, and the voltage reference value Vd is calculated. The voltage reference value Vd calculated by the PI controller 13 is converted into three-phase voltage reference values Vu, Vv, and Vw by the phase angle reference value θm at the dq/abc converter 14.

The three-phase voltage reference values Vu, Vv, and Vw are control signals that command the voltage amplitude, the frequency, and the phase of the voltage of each phase constituting the three phases, and are composed of voltage waveforms. The three-phase voltage reference values Vu, Vv, and Vw are control signals for controlling the gate pulse generator 22. The three-phase voltage reference values Vu, Vv, and Vw command the voltage amplitude, the frequency, and the phase by voltage waveforms. The control signal with respect to the voltage reference values Vu, Vv, and Vw may command the voltage amplitude, the frequency, and the phase by telegram.

The above is the configuration of the power converter 1 and the power conversion system 100.

[1-2. Action]

Next, an outline of the operation of the power converter 1 and the power conversion system 100 of the present embodiment will be described with reference to FIGS. 1 to 8. The controller 54 of the power converter 1 calculates the phase angle reference value θm by the phase controller 20 based on the control amount for the proportional control based on the difference between the active power reference value Pe and the output active power P, and calculates the voltage reference values Vu, Vv, and Vw by the voltage controller 10 based on the phase angle reference value θm. The gate pulse generator 55 of the power converter 1 controls the power conversion unit 52 based on the voltage reference values Vu, Vv, and Vw calculated by the controller 54.

The active power reference value Pe is input to the subtracter 21 of the phase controller 20. The active power reference value Pe is transmitted from the EMS 4. Further, the output active power P with respect to the electric power output from the power converter 1 is input to the subtracter 21. The output active power P is calculated by the controller 54 based on the measured voltage value Vs, the measured current value Is, and the phase angle θs measured by the voltage current meter 53. The fundamental angular frequency ω0 is input to the adder 23. The fundamental angular frequency ω0 may be transmitted from the EMS 4 or may be preset and held by the phase controller 20.

The subtracter 21 subtracts the output active power P from the active power reference value Pe. Based on the difference between the active power reference value Pe and the output active power P subtracted by the subtracter 21, the first-order lag controller 22 calculates the control amount for the first-order lag process. On the other hand, based on the difference between the active power reference value Pe and the output active power P subtracted by the subtracter 21, the proportional controller 25 calculates the control amount for the proportional control. The control amount with respect to the proportional control is calculated by multiplying the difference between the active power reference value Pe and the output active power P by the proportional gain K. After that, the control amount calculated by the first-order lag controller 22, the control amount calculated by the proportional controller 25, and the fundamental angular frequency ω0 are added by the adder 23, integrated by the integrator 24, and converted into a phase angle reference value θm.

The measured voltage value Vs measured by the voltage current meter 53 is input to the abc/dq converter 15 of the voltage controller 10. The measured voltage value Vs is measured by the voltage current meter 53 and transmitted. Further, the phase angle reference value θm is input to the abc/dq converter 15. The phase angle reference value θm is calculated by the phase controller 20. The voltage command value V0 is input to the subtracter 11. The voltage command value V0 may be transmitted from the EMS 4 or may be preset and held by the voltage controller 10. The phase angle reference value θm is input to the dq/abc converter 14.

The measured voltage value Vs is converted into a d-axis voltage Vsd by the abc/dq converter 15. The subtracter 11 subtracts the d-axis voltage Vsd from the voltage command value V0. Based on the difference between the voltage command value V0 and the d-axis voltage Vsd subtracted by the subtracter 11, the first-order lag controller 12 calculates the control amount for the first-order lag process. After that, the control amount calculated by the first-order lag controller 12 is PI controlled by the PI controller 13, and the voltage reference value Vd is calculated. The voltage reference value Vd calculated by the PI controller 13 is phase-controlled by the phase angle reference value θm at the dq/abc converter 14, and is converted into three-phase voltage reference values Vu, Vv, and Vw.

The three-phase voltage reference values Vu, Vv, and Vw are control signals that command the voltage amplitude, the frequency, and the phase of the voltage of each phase constituting the three phases, and are composed of voltage waveforms. The three-phase voltage reference values Vu, Vv, and Vw are control signals for controlling the gate pulse generator 22. The three-phase voltage reference values Vu, Vv, and Vw command the voltage amplitude, the frequency, and the phase by voltage waveforms. The control signal with respect to the voltage reference values Vu, Vv, and Vw may command the voltage amplitude, the frequency, and the phase by telegram.

It is preferable that the proportional gain K with respect to the control amount for the proportional control calculated by the proportional controller 25 is calculated as follows.

The proportional gain K is calculated based on the frequency fluctuation Δf with respect to the output fluctuation ΔP of the inverter-based power source 6. Here, ΔP is calculated by the following equation. The active power reference value is shown as Pe, and the output active power is shown as P.

$$\Delta P = (Pe - P) \quad \text{(formula 1)}$$

In the output fluctuation ΔP of the electric power output from the power converter 1, the maximum expected output fluctuation value is ΔPmax, and the maximum allowable frequency fluctuation is Δfmax.

Assuming that the first-order lag controller 22 is not provided in FIG. 3B and the control is performed by the proportional gain K only by the proportional controller 25, the relationship between the output fluctuation ΔP and the frequency fluctuation Δf can be expressed by the following formula.

$$\Delta f = K \Delta P \quad \text{(formula 2)}$$

When ΔP=ΔPmax, control is performed so that Δf≤Δfmax. Therefore, it is preferable that the proportional gain K is given by the following formula.

$$K \leq \Delta f \max / \Delta P \max \quad \text{(formula 3)}$$

In addition, assuming that the proportional controller 25 is not provided in FIG. 3B and the control is performed only by the first-order lag controller 22, the relationship between the output fluctuation ΔP and the frequency fluctuation Δf can be expressed by the following formula. D is a control coefficient D.

$$\Delta f = (1/D) \Delta P \quad \text{(formula 4)}$$

Next, assuming that the control is performed by the proportional controller 25 and the first-order lag controller 22, the relationship between the output fluctuation ΔP and the frequency fluctuation Δf can be expressed by the following formula.

$$\Delta f = [(1/D) + K] \Delta P \quad \text{(formula 5)}$$

In (formula 5), when K≥(1/D), the frequency fluctuation Δf is more than doubled as compared with (formula 4), which is inconvenient. Therefore, it is preferable that K<(1/D). Since when ΔP=ΔPmax, control is performed so that Δf≤Δfmax, the proportional gain K is preferably given by the following formula.

$$K \leq (\Delta f \max / \Delta P \max) - (1/D) \quad \text{(formula 6)}$$

Figure 3:
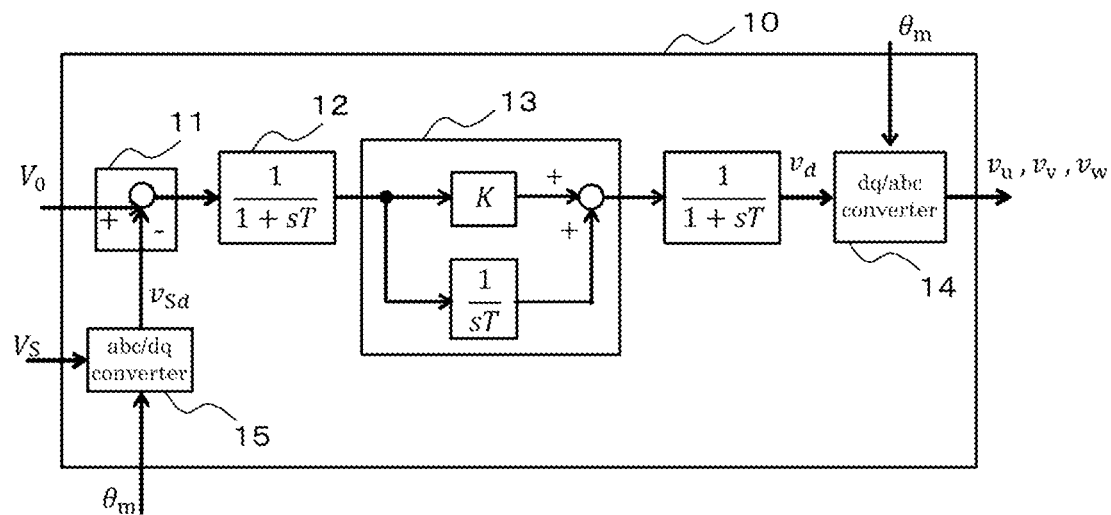
FIG. 3 is a diagram illustrating a structure of the voltage controller and the phase controller of the power converter according to the first embodiment.
Figure 3:
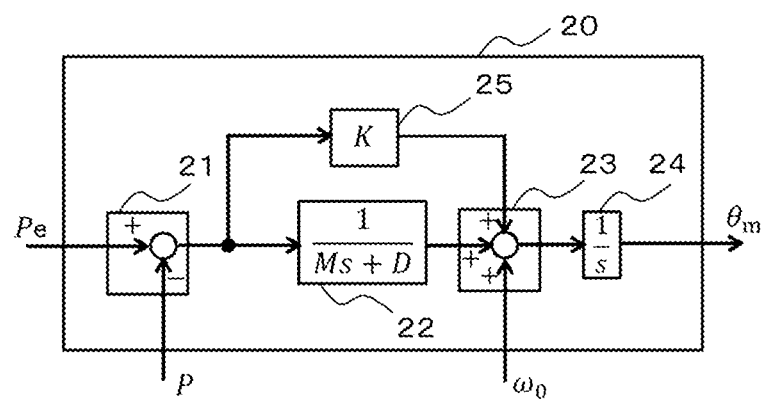
Figure 5:
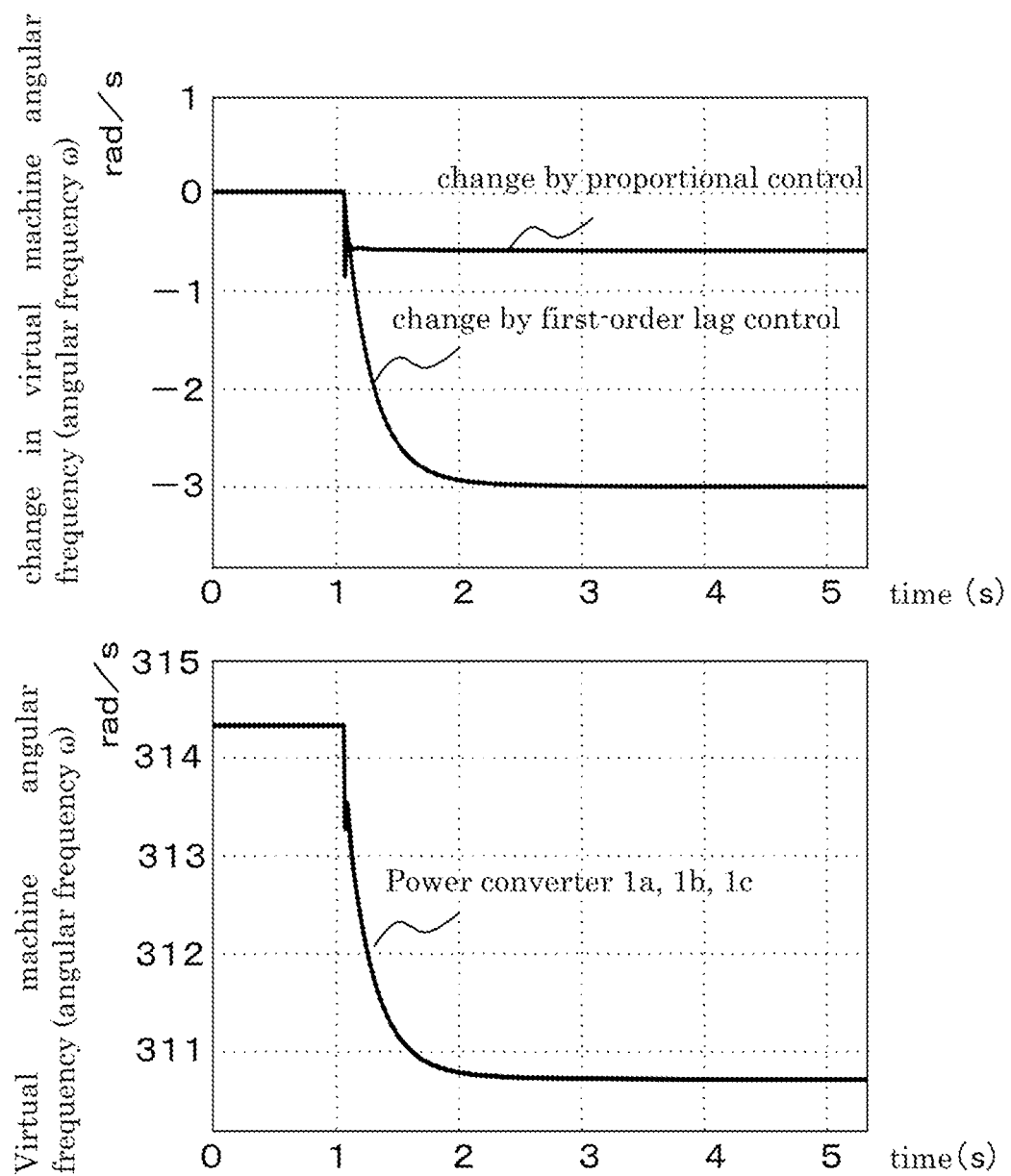
FIG. 5 is a diagram illustrating the change in the virtual machine angular frequency and the virtual machine angular frequency of the power converter according to the first embodiment.
Figure 7:
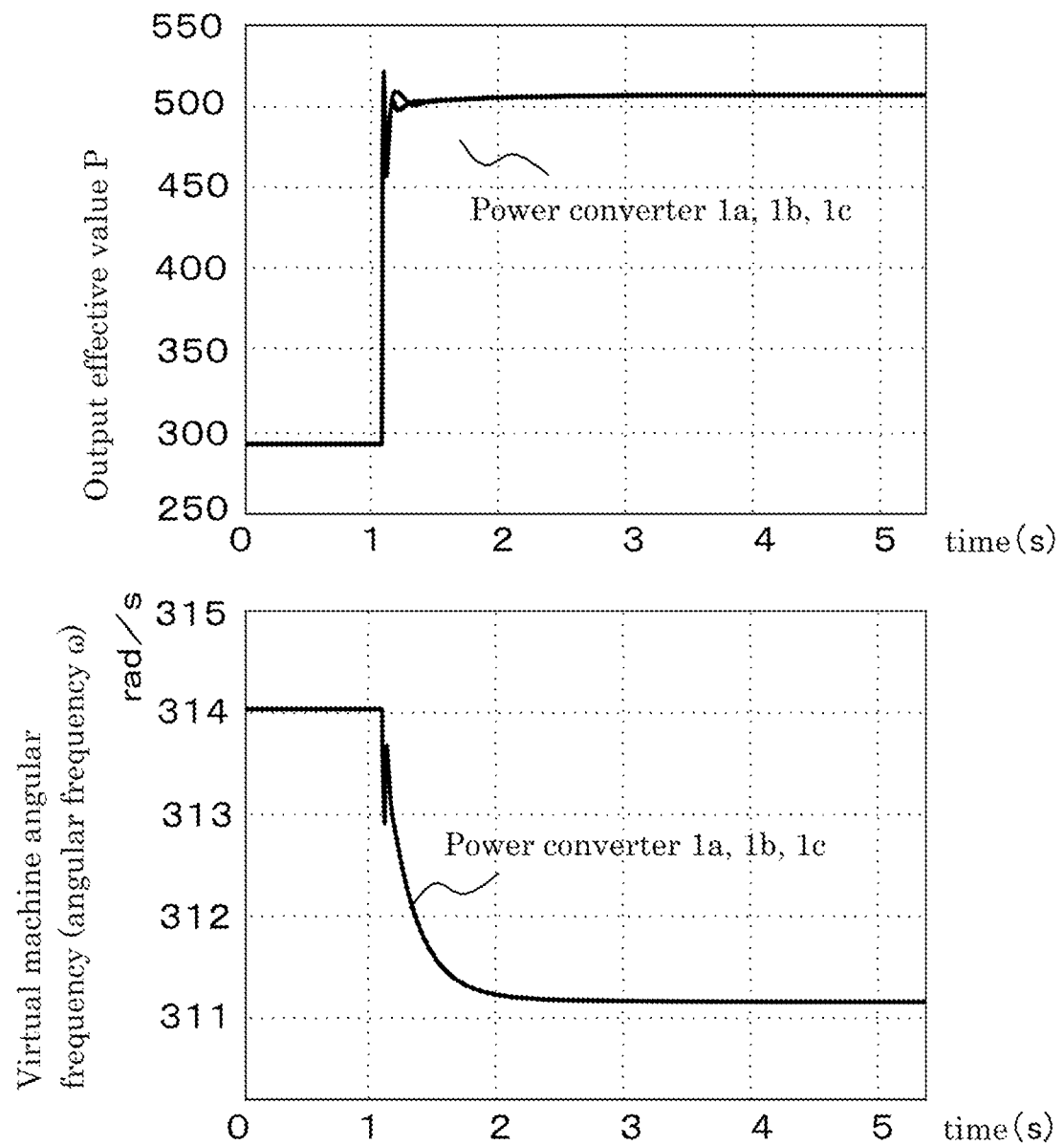
FIG. 7 is a diagram illustrating the output active power and the virtual machine angular frequency of the power converter according to the first embodiment.

When the phase angle reference value θm is calculated by the phase controller 20 illustrated in FIG. 3 and the voltage reference value Vd is calculated by the voltage controller 10 based on the phase angle reference value θm, the change in the virtual machine angular frequency (angular frequency ω) of the power converter) and the virtual machine angular frequency (angular frequency ω) are as shown in FIG. 5. The output active power P and the virtual machine angular frequency (angular frequency ω) of the power converter 1 are as shown in FIG. 7.

The output active power P fluctuates due to the load fluctuation, and the difference between the active power reference value Pe and the output active power P is added to the fundamental angular frequency ω0 via the first-order lag controller 22 and the proportional controller 25 connected in parallel. That is, the change in the virtual machine angular frequency (angular frequency ω) is the sum of the control amount by the first-order lag controller 22 and the control amount by the proportional controller 25. The change in the virtual machine angular frequency (angular frequency ω) is increased by the control amount by the proportional controller 25, as compared with the case where the control is performed by the first-order lag controller 22 that does not have the proportional controller 25.

After load fluctuated, the control amount by the proportional controller 25 fluctuates rapidly. The phase controller 20 having the proportional controller 25 shown in FIG. 3 can rapidly change the phase angle reference value θm after load fluctuated. As a result, the oscillation of the output active power P of the power converter 1 is suppressed, and as a result, the cross current is reduced.

The control amount calculated by the first-order lag controller 22, the control amount calculated by the proportional controller 25, and the reference frequency coo are added by the adder 23, integrated as a virtual machine angular frequency (angular frequency ω) by the integrator 24, and converted into the phase angle reference value θm.

Figure 4:
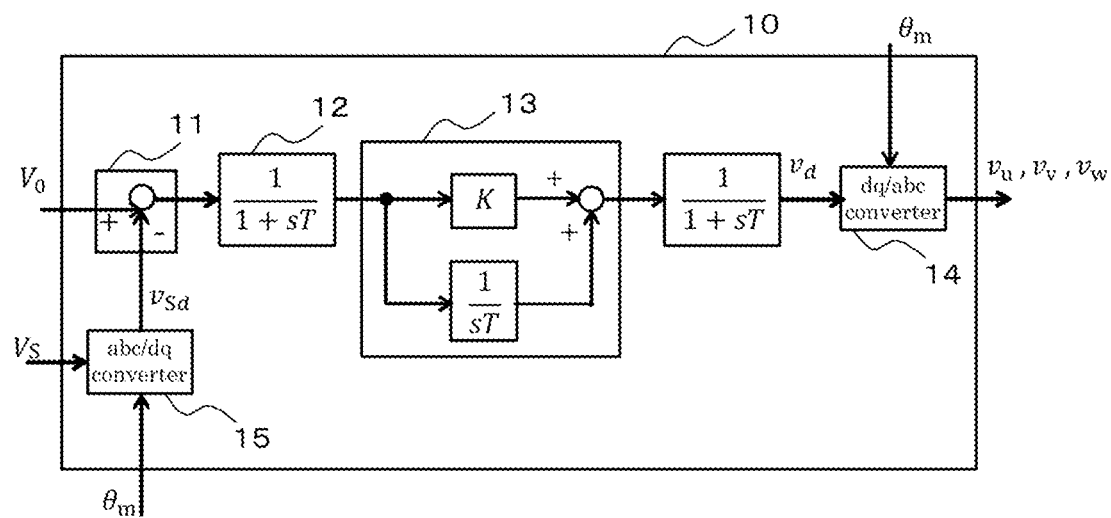
FIG. 4 is a diagram illustrating a structure of the voltage controller and the phase controller of the power converter according to the prior art.
Figure 4:
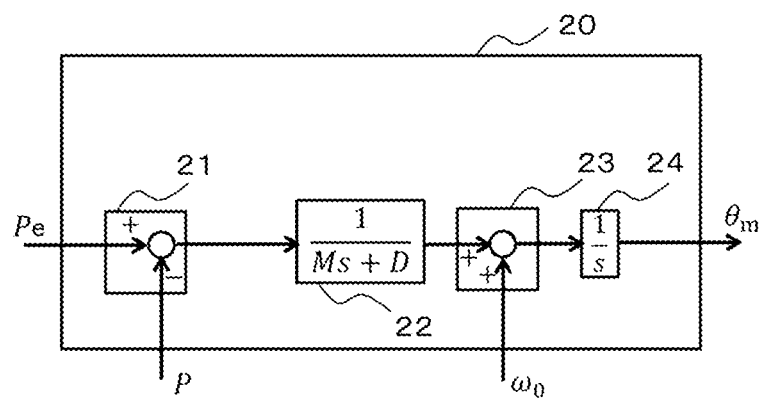
Figure 6:
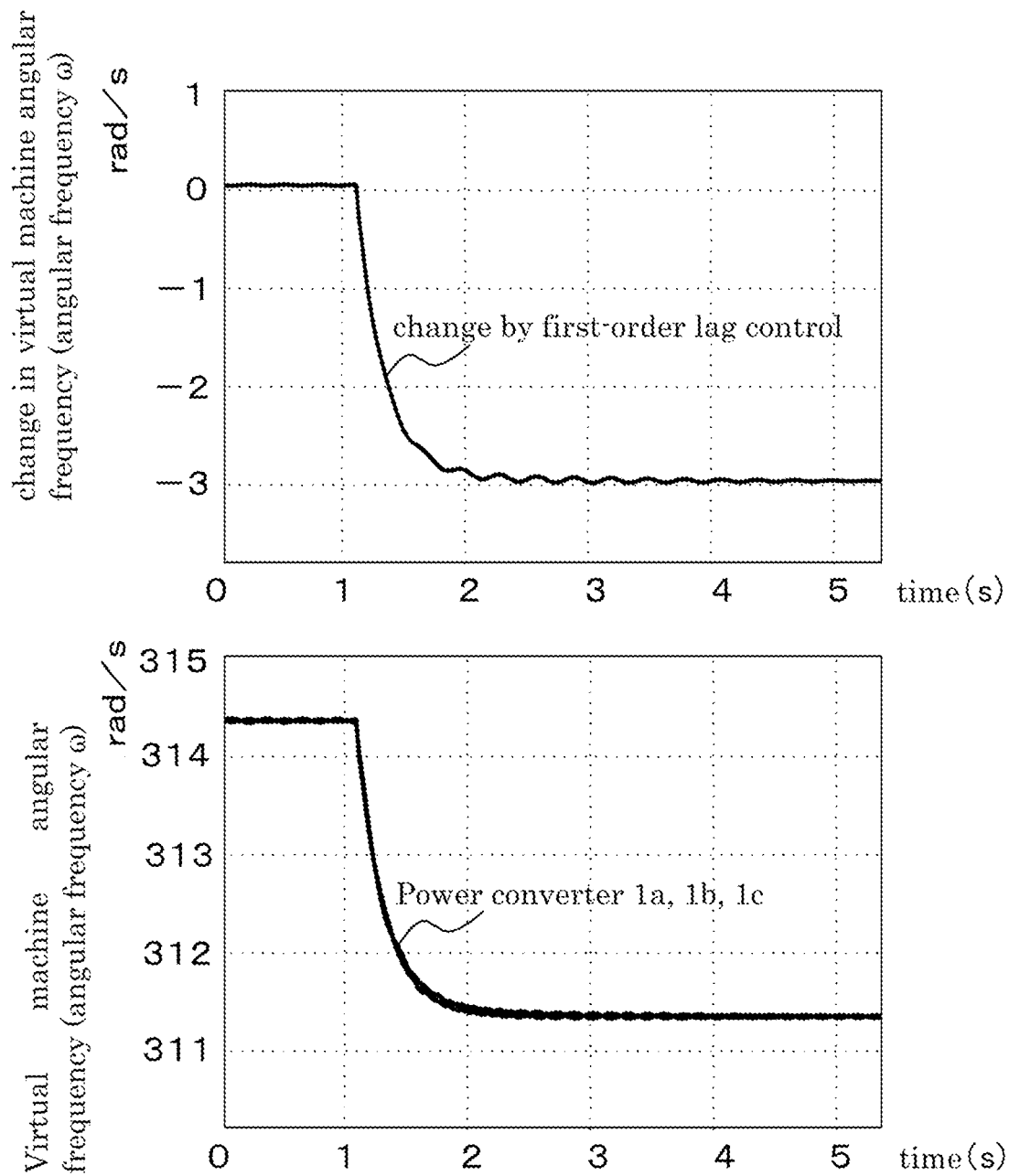
FIG. 6 is a diagram illustrating the change in the virtual machine angular frequency and the virtual machine angular frequency of the power converter according to the prior art.
Figure 8:
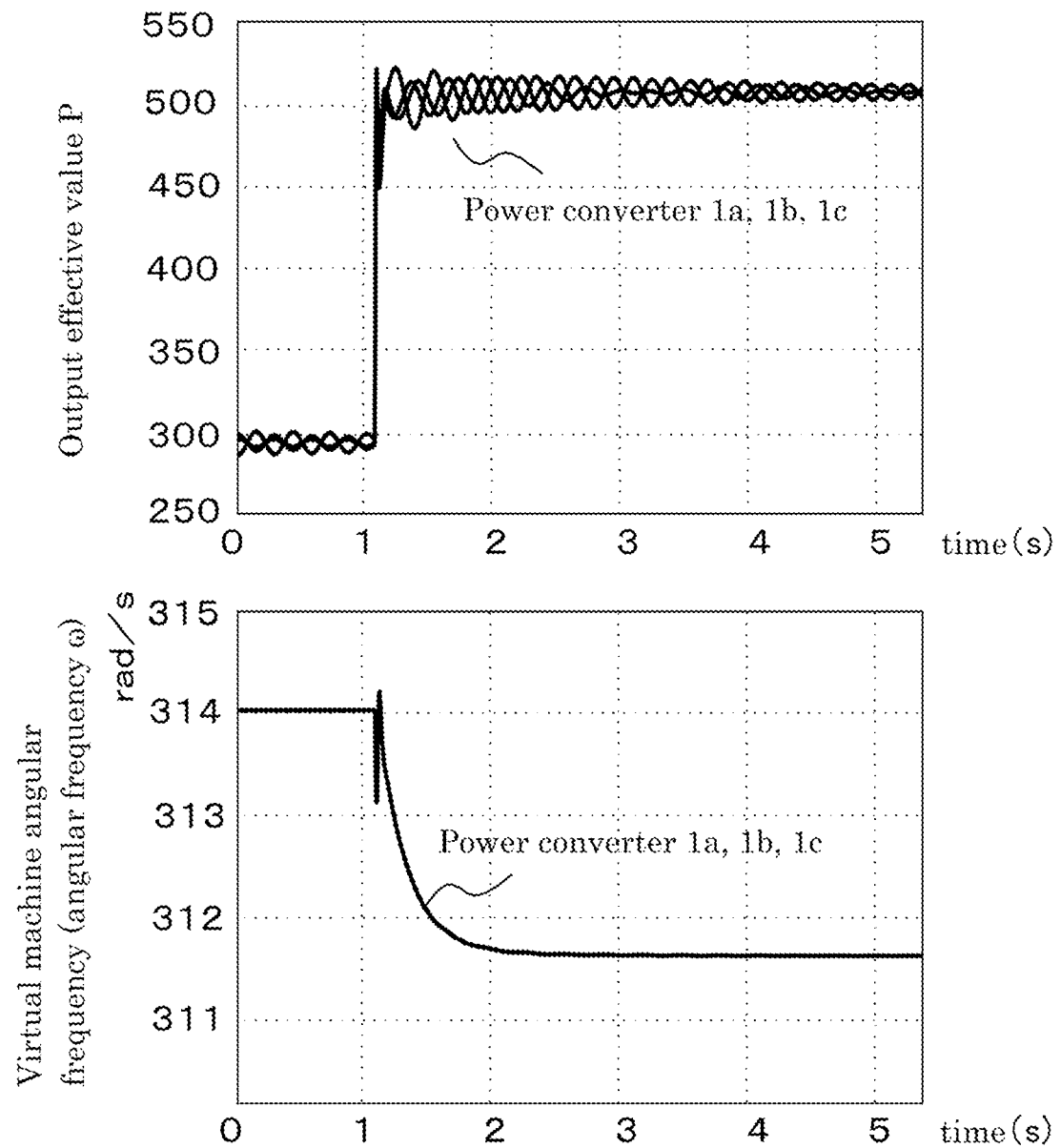
FIG. 8 is a diagram illustrating the output active power and the virtual machine angular frequency of the power converter according to the prior art.

In case of the phase controller 20 that does not have the proportional controller 25 shown in FIG. 4, the change in the virtual machine angular frequency (angular frequency ω) of the power converter 1 and the virtual machine angular frequency (angular frequency ω) are as shown in FIG. 6. The output active power P and the virtual machine angular frequency (angular frequency ω) of the power converter 1 are as shown in FIG. 8. When the load fluctuation occurs at t=1 (s), since the output active power P fluctuates due to the load fluctuation, the difference between the active power reference value Pe and the output active power P is added to the fundamental angular frequency ω via the first-order lag controller 22.

Since it does not have the proportional controller 25, the phase controller 20 does not have the proportional controller 25 as shown in FIG. 4 cannot rapidly change the phase angle reference value θm after load fluctuated. Accordingly, the oscillation of the output active power P of the power converter 1 is not suppressed, and as a result, the cross current is not reduced.

The above is the outline of the operation of the power converter 1 and the power conversion system 100 according to the first embodiment.

[1-3. Effect]

(1) According to the present embodiment, Since the power converter 1 includes a phase controller 20 that calculate a phase angle reference value θm based on a difference between a commanded active power reference value Pe and an output active power P supplied to a distribution line 5, a voltage controller 10 that calculates a voltage reference values Vu, Vv, and Vw based on the phase angle reference value θm calculated by the phase controller 20, and a power conversion unit 52 that converts, based on the voltage reference values Vu, Vv, and Vw calculated by the voltage controller 10, an electric power supplied from a power supply source 60 into AC power and outputs it to the distribution line 5, it is possible to provide a power converter 1 capable of reducing cross current.

(2) According to the present embodiment, since the phase controller 20 of the power converter 1 calculates the phase angle reference value θm by adding the control amount for proportional control based on the difference between the active power reference value Pe and the output active power P and the control amount by the first-order lag controller based on the difference between the active power reference value Pe and the output active power P, the phase angle reference value θm can be rapidly changed after load fluctuated. Accordingly, the oscillation of the electric power output from the power converter 1 is suppressed. As a result, the cross current is reduced.

2. Second Embodiment

[2-1. Configuration and Function]

Figure 9:
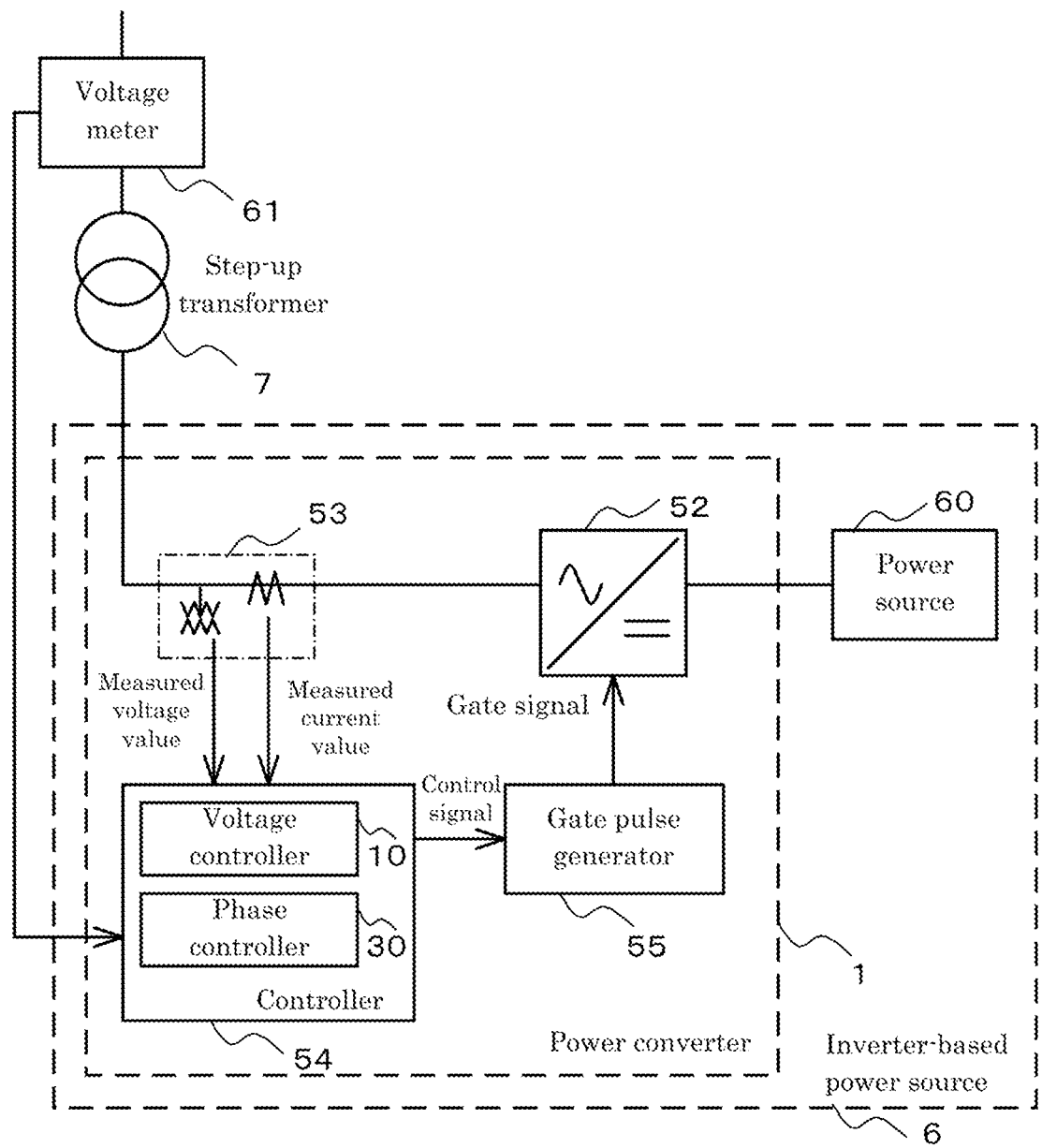
FIG. 9 is a diagram illustrating a structure power converter according to the second embodiment.
Figure 10:
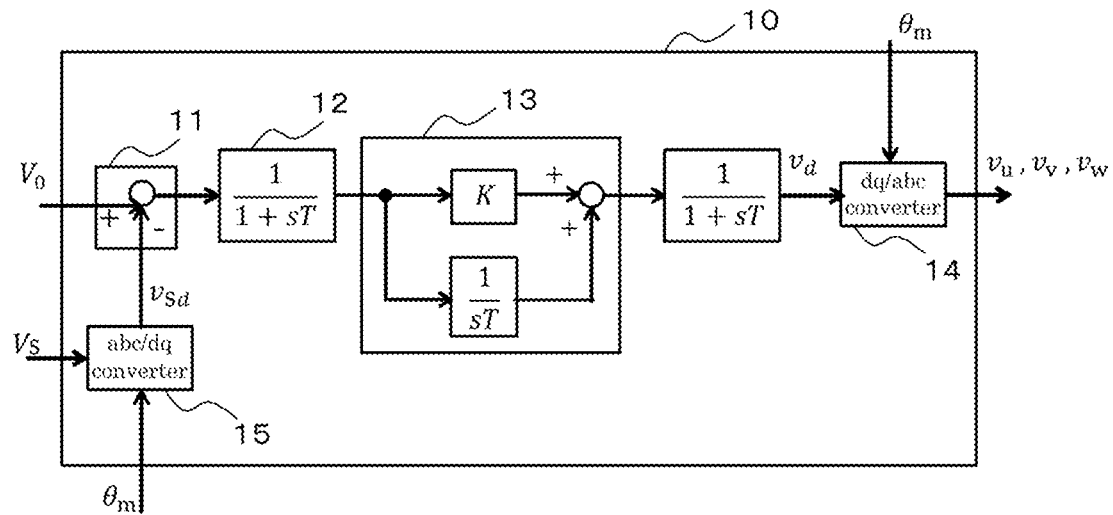
FIG. 10 is a diagram illustrating a structure of the voltage controller and the phase controller of the power converter according to the second embodiment.
Figure 10:
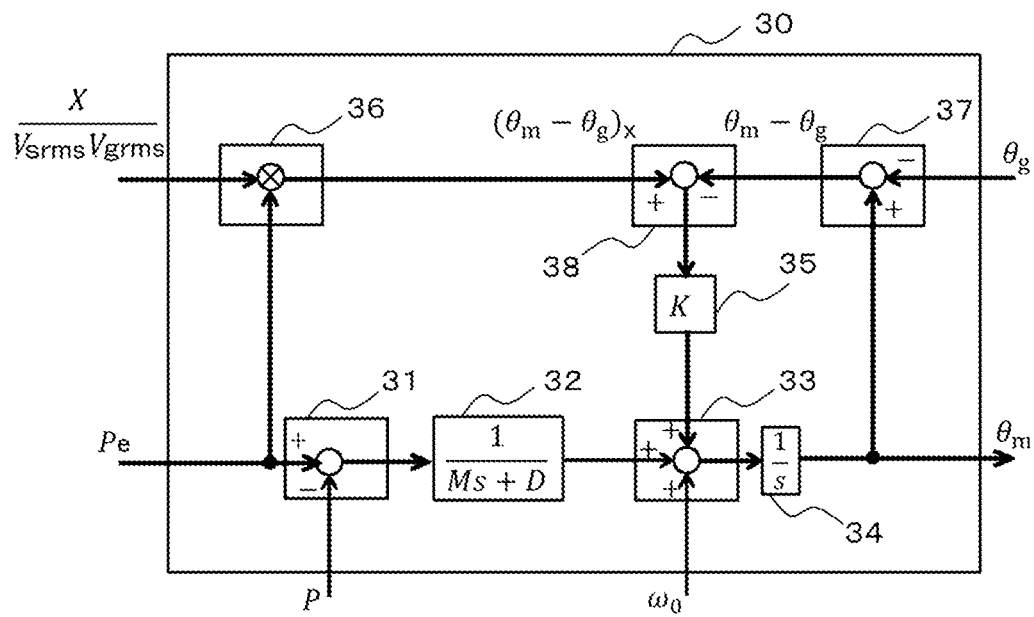

An example of the power converter 1 according to the second embodiment will be described with reference to FIGS. 9 to 10. The controller 54 of the power converter 1 according to the first embodiment includes the phase controller 20, however the controller 54 of the power converter 1 according to the second embodiment includes the phase controller 30 instead of the phase controller 20. A voltage meter 61 is arranged between the step-up transformer 7 and the distribution line 5. The voltage meter 61 outputs the measured voltage value of the distribution line 5 to the controller 54 of the inverter-based power source 6. Other configurations are the same as those of the power converter 1 according to the first embodiment.

The phase controller 30 according to the second embodiment is composed of the control block shown in FIG. 10B. The phase controller 30 includes a subtracter 31, a first-order lag controller 32, an adder 33, an integrator 34, and a proportional controller 35, a multiplier 36, a subtracter 37, and a subtracter 38. The subtracter 31, the first-order lag controller 32, the adder 33, and the integrator 34 of the phase controller 30 are connected in series in this order. The proportional controller 35 is connected in parallel to the first-order lag controller 32. The control amount output from the proportional controller 35 is added to the control amount output from the first-order lag controller 32 at the adder 33.

The active power reference value Pe is input to the subtracter 31 of the phase controller 30. The active power reference value Pe is transmitted from the EMS 4. Further, the output active power P with respect to the electric power output from the power converter 1 is input to the subtracter 31. The output active power P is calculated by the controller 54 based on the measured voltage value Vs, the measured current value Is, and the phase angle θs measured by the voltage current meter 53. The fundamental angular frequency ω0 and the control amount output from the proportional controller 35 are input to the adder 33. The fundamental angular frequency ω0 may be transmitted from the EMS 4 or may be preset and held by the phase controller 30.

The subtracter 31 subtracts the output active power P from the active power reference value Pe. Based on the difference between the active power reference value Pe and the output active power P subtracted by the subtracter 31, the first-order lag controller 32 calculates the control amount for the first-order lag process. The proportional controller 35 calculates a control amount for proportional control, which will be described later. After that, the control amount calculated by the first-order lag controller 32, the control amount calculated by the proportional controller 35, and the fundamental angular frequency ω0 are added by the adder 33, integrated by the integrator 34, and converted into a phase angle reference value θm.

The multiplier 36 multiplies the active power reference value Pe and the numerical value (X/(Vsrms·Vgrms)) to calculate the phase angle difference reference value (θm−θg) x. X is the reactance of the step-up transformer 7 to which the power converter 1 is connected. The reactance X is preset and held in the phase controller 30. Vsrms is an effective value of the measured voltage value Vs. Vgrms is an effective value of the voltage Vg of the distribution line 5. The voltage effective value Vgrms is measured by the voltage meter 61.

The subtracter 37 calculates an actually measured phase angle difference (θm−θg), which is the difference between the phase angle reference value θm and the system phase angle θg, and outputs it to the subtracter 38. The phase angle reference value θm is output from the integrator 34. The system phase angle θg is calculated based on the voltage Vg of the distribution line 5.

The subtracter 38 calculates a difference between the phase angle difference reference value (θm−θg), x and the measured phase angle difference (θm−θg), and outputs it to the proportional controller 35. Based on the difference between the phase angle difference reference value (θm−θg), x and the measured phase angle difference (θm−θg), the proportional controller 35 calculates the control amount for proportional control. After that, the control amount calculated by the first-order lag controller 32, the control amount calculated by the proportional controller 35, and the fundamental angular frequency ω0 are added by the adder 33, integrated by the integrator 34, and converted into a phase angle reference value θm.

The voltage controller 10 is composed of the control block shown in FIG. 10A, as in the first embodiment. The measured voltage value Vs measured by the voltage current meter 53 is input to the abc/dq converter 15 of the voltage controller 10. The measured voltage value Vs is measured by the voltage current meter 53 and transmitted. Further, the phase angle reference value θm is input to the abc/dq converter 15. The phase angle reference value θm is calculated by the phase controller 30. The voltage command value V0 is input to the subtracter 11. The voltage command value V0 may be transmitted from the EMS 4 or may be preset and held by the voltage controller 10. The phase angle reference value θm is input to the dq/abc converter 14.

The measured voltage value Vs is converted into a d-axis voltage Vsd by the abc/dq converter 15. The subtracter 11 subtracts the d-axis voltage Vsd from the voltage command value V0. Based on the difference between the voltage command value V0 and the d-axis voltage Vsd subtracted by the subtracter 11, the first-order lag controller 12 calculates the control amount for the first-order lag process. After that, the control amount calculated by the first-order lag controller 12 is PI controlled by the PI controller 13, and the voltage reference value Vd is calculated. The voltage reference value Vd calculated by the PI controller 13 is converted into three-phase voltage reference values Vu, Vv, and Vw by the phase angle reference value θm at the dq/abc converter 14.

It is preferable that the proportional gain K with respect to the control amount for the proportional control calculated by the proportional controller 35 is calculated as follows.

The relationship between the output fluctuation ΔP and the frequency fluctuation Δf can be expressed by the following formula. Here, when the power converter 1 is a virtual generator, the phase angle is θm, the phase angle of the entire distribution line 5 is θg, and the sum of the reactors of the step-up transformer 7 and the PCS reactor to which the power converter 1 is connected is the reactance X, the voltage effective value of the inverter-based power source 6 which is the PCS output end voltage is Vsrms, and the voltage effective value of the distribution line 5 which is the grid interconnection point voltage is Vgrms.

[Equation 1]

$$\Delta f = \frac{1}{D}\Delta P + K\left(\frac{X}{Vsrms\ Vgrms}Pe - (\theta_m - \theta_g)\right) \quad \text{(Formula 7)}$$
$$= \frac{1}{D}\Delta P + K\left(\frac{X}{Vsrms\ Vgrms}Pe - \frac{X}{Vsrms\ Vgrms}P\right)$$
$$= \frac{1}{D}\Delta P + K\frac{X}{Vsrms\ Vgrms}\Delta P$$
$$= \left(\frac{1}{D} + K\frac{X}{Vsrms\ Vgrms}\right)\Delta P$$

In (formula 7), when K≥(VsrmsVgrms)/XD, the frequency fluctuation Δf is more than doubled as compared with (formula 4), which is inconvenient. Therefore, it is preferable that K<(VsrmsVgrms)/XD. Since when ΔP=ΔPmax, control is performed so that Δf≤Δfmax, the proportional gain K is preferably given by the following formula.

[Equation 2]

$$K \leq \frac{Vsrms\ Vgrms}{X}\left(\frac{\Delta f_{max}}{\Delta P_{max}} - \frac{1}{D}\right) \quad \text{(Formula 8)}$$

Figure 11:
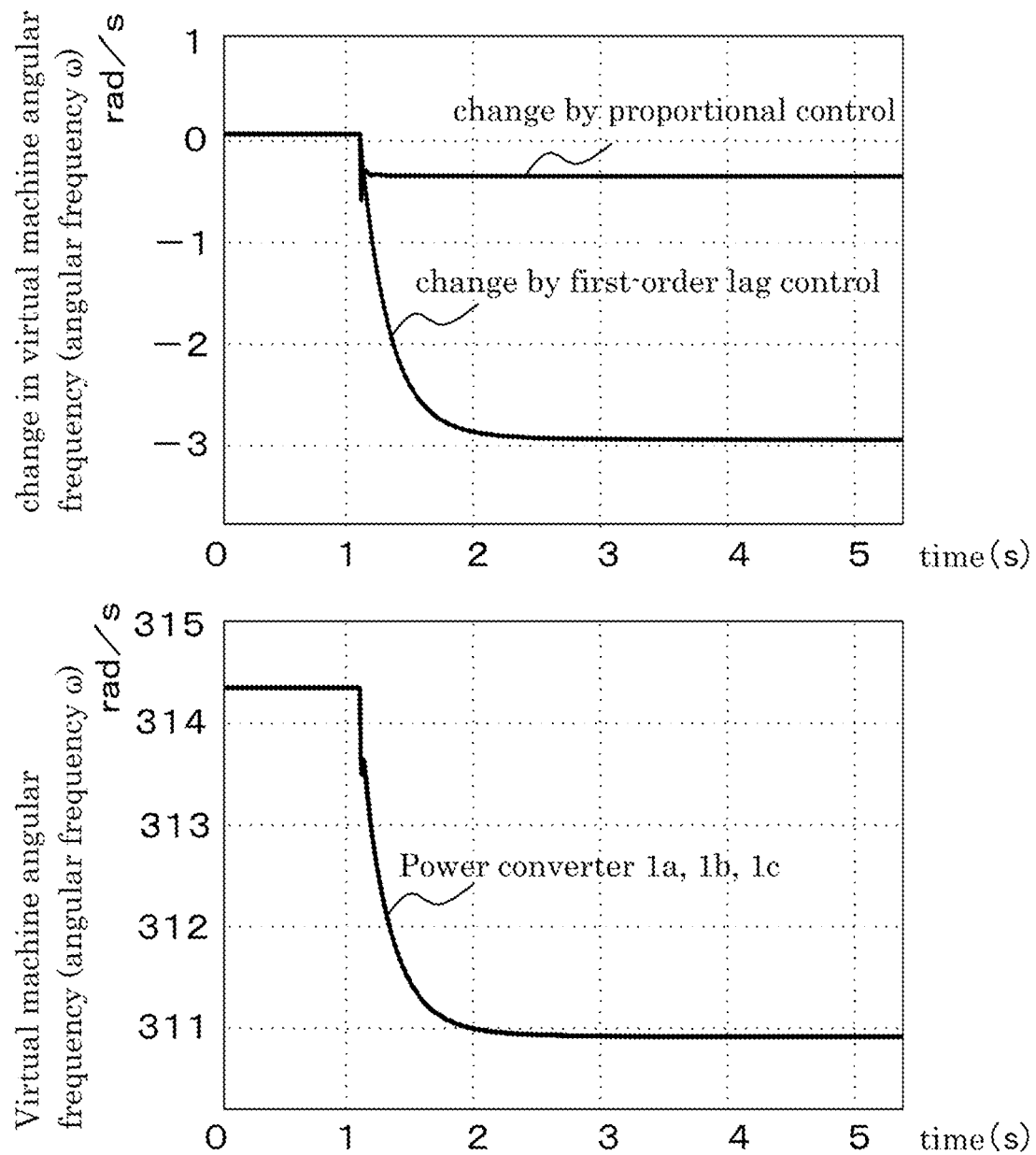
FIG. 11 is a diagram illustrating the change in the virtual machine angular frequency and the virtual machine angular frequency of the power converter according to the second embodiment.
Figure 12:
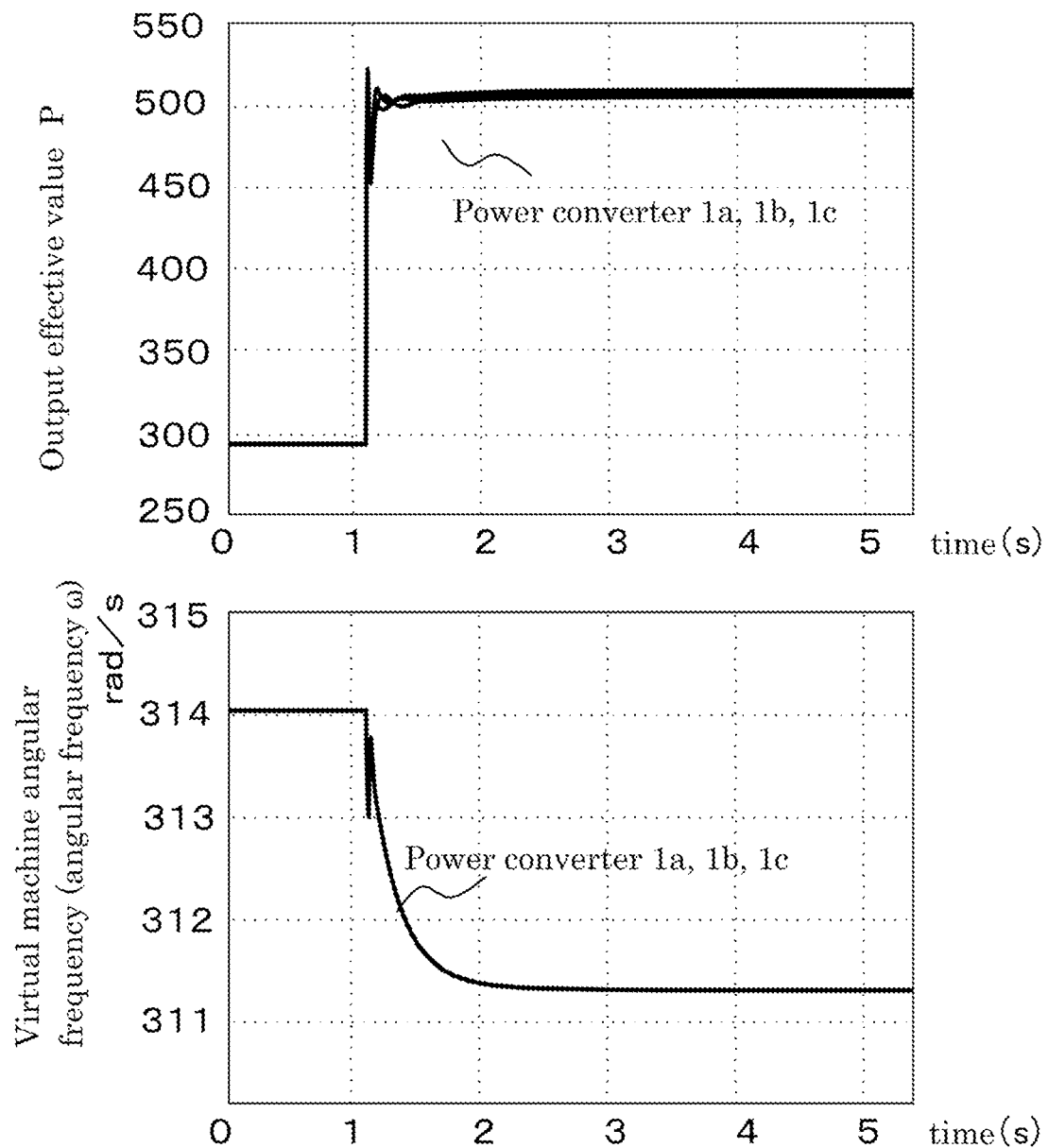
FIG. 12 is a diagram illustrating the virtual machine angular frequency and the output active power of the power converter according to the second embodiment.

When the phase angle reference value θm is calculated by the phase controller 30 illustrated in FIG. 10B and the voltage reference value Vd is calculated by the voltage controller 10 based on the phase angle reference value θm, the change in the virtual machine angular frequency (angular frequency ω) of the power converter 1 and the virtual machine angular frequency (angular frequency ω) are as shown in FIG. 11. The output active power P and the virtual machine angular frequency (angular frequency ω) of the power converter 1 are as shown in FIG. 12.

The output active power P fluctuates due to the load fluctuation, and the difference between the active power reference value Pe and the output active power P is added to the fundamental angular frequency ω0 via the first-order lag controller 22. On the other hand, the difference between the phase angle difference reference value (θm−θg), x between the virtual machine angle and the grid interconnection point and the measured phase angle difference (θm−θg), is converted into a control amount by the proportional control in the proportional controller 35 having the proportional gain K, and is added to the fundamental angular frequency ω0.

The phase angle difference reference value (θm−θg), x is a prediction of a convergence value. The phase angle difference reference value (θm−θg), x is calculated by the active power reference value Pe, the reactance X which is the sum of the reactances of the PCS reactor and the step-up transformer 7, the voltage effective value Vsrms of the measured voltage value Vs, and the voltage effective value Vgrms of the voltage Vg of the distribution line 5

The change in the virtual machine angular frequency (angular frequency ω) is the sum of the control amount by the first-order lag controller 32 and the control amount by the proportional controller 35. The change in the virtual machine angular frequency (angular frequency ω) is increased by the control amount by the proportional controller 35, as compared with the case where the control is performed by the first-order lag controller 32 that does not have the proportional controller 35.

After load fluctuated, the control amount by the proportional controller 35 fluctuates rapidly. The phase controller 30 having the proportional controller 35 shown in FIG. 10B can rapidly change the phase angle reference value θm after load fluctuated. As a result, the oscillation of the output active power P of the power converter 1 is suppressed, and as a result, the cross current is reduced.

The control amount calculated by the first-order lag controller 32, the control amount calculated by the proportional controller 35, and the reference frequency ω0 are added by the adder 33, integrated as a virtual machine angular frequency (angular frequency ω) by the integrator 34, and converted into the phase angle reference value θm.

The above is the outline of the configuration and the operation of the power converter 1 and the power conversion system 100 according to the second embodiment.

[2-2. Effect]

(1) According the present embodiment, since the phase controller 30 of the power converter 1 calculates the phase angle reference value θm by adding the control amount for proportional control based on the difference between the phase angle difference reference value (θm−θg), x and the measured phase angle difference (θm−θg), and the control amount by the first-order lag controller based on the difference between the active power reference value Pe and the output active power P, the phase angle reference value θm can be rapidly changed after load fluctuated. Accordingly, the oscillation of the electric power output from the power converter 1 is suppressed. As a result, the cross current is reduced.

(2) According to the present embodiment, since the phase angle difference reference value (θm−θg), x is calculated by the phase controller 30 based on the active power reference value Pe, the reactance X to the distribution line 5, the output voltage effective value Vsrms, and Vgrms, the phase angle difference reference value (θm−θg), x is calculated by commanding the measured voltage value Vs and the voltage effective value Vsrms and Vgrms based on the voltage Vg of the distribution line 5, it is possible to efficiently reduce the cross current according to the situation of the distribution line 5.

3.0 Other Embodiments

Although the embodiment that includes the modified example thereof has been described, such embodiment is merely presented as an example, and is not intended to limit the scope of the present embodiment. Such embodiments can be implemented in other various forms, and various omissions, replacements, and modifications can be made without departing from the scope of the present embodiment. Such embodiment and the modified form thereof are within the scope of the present embodiment and also within the scope of the invention as recited in the appended claims and the equivalent range thereto. The followings are examples thereof.

Figure 13:
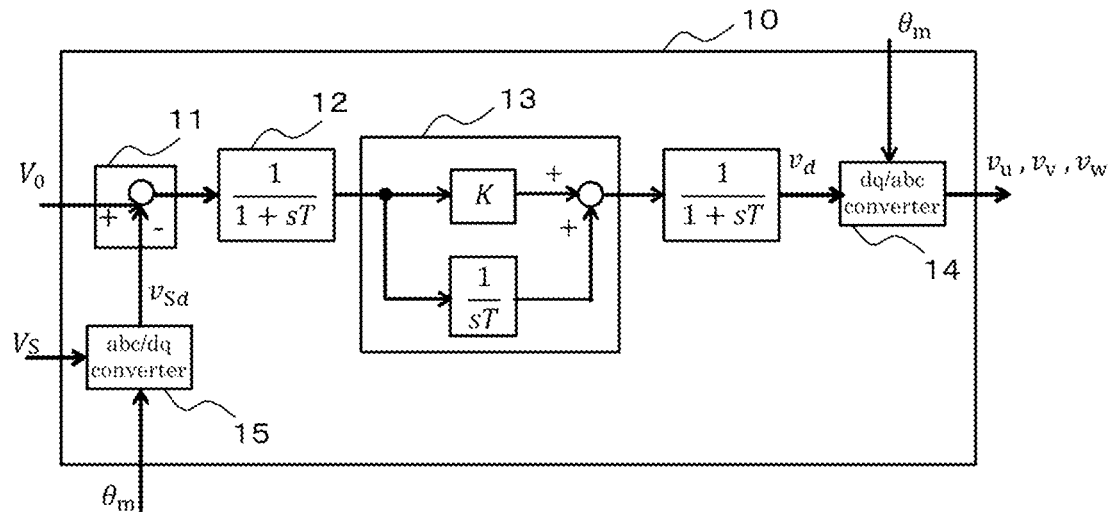
FIG. 13 is a diagram illustrating a structure of the voltage controller and the phase controller of the power converter according to the other embodiment.
Figure 13:
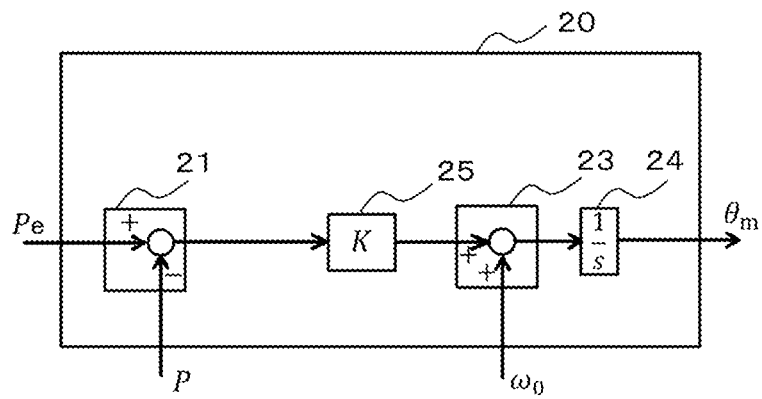

(1) In the first embodiment, the controller 54 of the power converter 1 has the configuration shown in FIG. 3, however the controller 54 of the power converter 1 may have the configuration shown in FIG. 13. That is, the phase controller 20 is composed of the control block shown in FIG. 13B. The phase controller 20 according to the first embodiment includes a subtracter 21, a first-order lag controller 22, an adder 23, an integrator 24, and a proportional controller 25. However, the phase controller 20 may not have a first-order lag controller 22, and may be composed of a subtracter 21, a proportional controller 25, an adder 23, and an integrator 24.

The active power reference value Pe is input to the subtracter 21 of the phase controller 20. The active power reference value Pe is transmitted from the EMS 4. Further, the output active power P with respect to the electric power output from the power converter 1 is input to the subtracter 21. The output active power P is calculated by the controller 54 based on the measured voltage value Vs, the measured current value Is, and the phase angle θs measured by the voltage current meter 53. The fundamental angular frequency ω0 is input to the adder 23. The fundamental angular frequency ω0 may be transmitted from the EMS 4 or may be preset and held by the phase controller 20.

The subtracter 21 subtracts the output active power P from the active power reference value Pe. Based on the difference between the active power reference value Pe and the output active power P subtracted by the subtracter 21, the proportional controller 25 calculates the control amount for the proportional control. The control amount with respect to the proportional control is calculated by multiplying the difference between the active power reference value Pe and the output active power P by the proportional gain K. After that, the control amount calculated by the proportional controller 25 and the fundamental angular frequency ω0 are added by the adder 23, integrated by the integrator 24, and converted into a phase angle reference value θm.

The measured voltage value Vs measured by the voltage current meter 53 is input to the abc/dq converter 15 of the voltage controller 10. The measured voltage value Vs is measured by the voltage current meter 53 and transmitted. Further, the phase angle reference value θm is input to the abc/dq converter 15. The phase angle reference value θm is calculated by the phase controller 20. The voltage command value V0 is input to the subtracter 11. The voltage command value V0 may be transmitted from the EMS 4 or may be preset and held by the voltage controller 10. The phase angle reference value θm is input to the dq/abc converter 14.

The measured voltage value Vs is converted into a d-axis voltage Vsd by the abc/dq converter 15. The subtracter 11 subtracts the d-axis voltage Vsd from the voltage command value V0. Based on the difference between the voltage command value V0 and the d-axis voltage Vsd subtracted by the subtracter 11, the first-order lag controller 12 calculates the control amount for the first-order lag process. After that, the control amount calculated by the first-order lag controller 12 is PI controlled by the PI controller 13, and the voltage reference value Vd is calculated. The voltage reference value Vd calculated by the PI controller 13 is phase-controlled by the phase angle reference value θm at the dq/abc converter 14, and is converted into three-phase voltage reference values Vu, Vv, and Vw.

Figure 14:
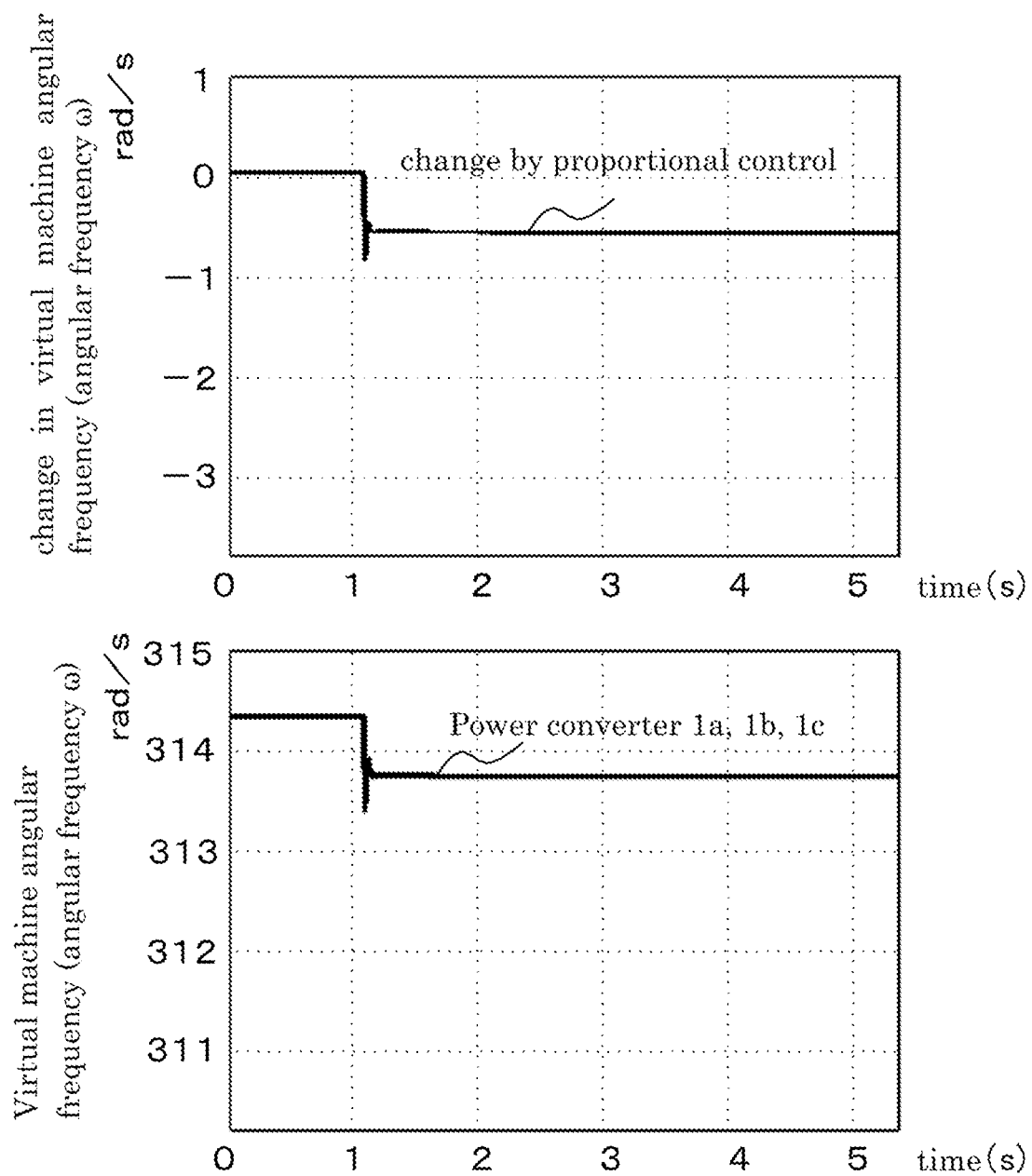
FIG. 14 is a diagram illustrating the change in the virtual machine angular frequency and the virtual machine angular frequency of the power converter according to the other embodiment.
Figure 15:
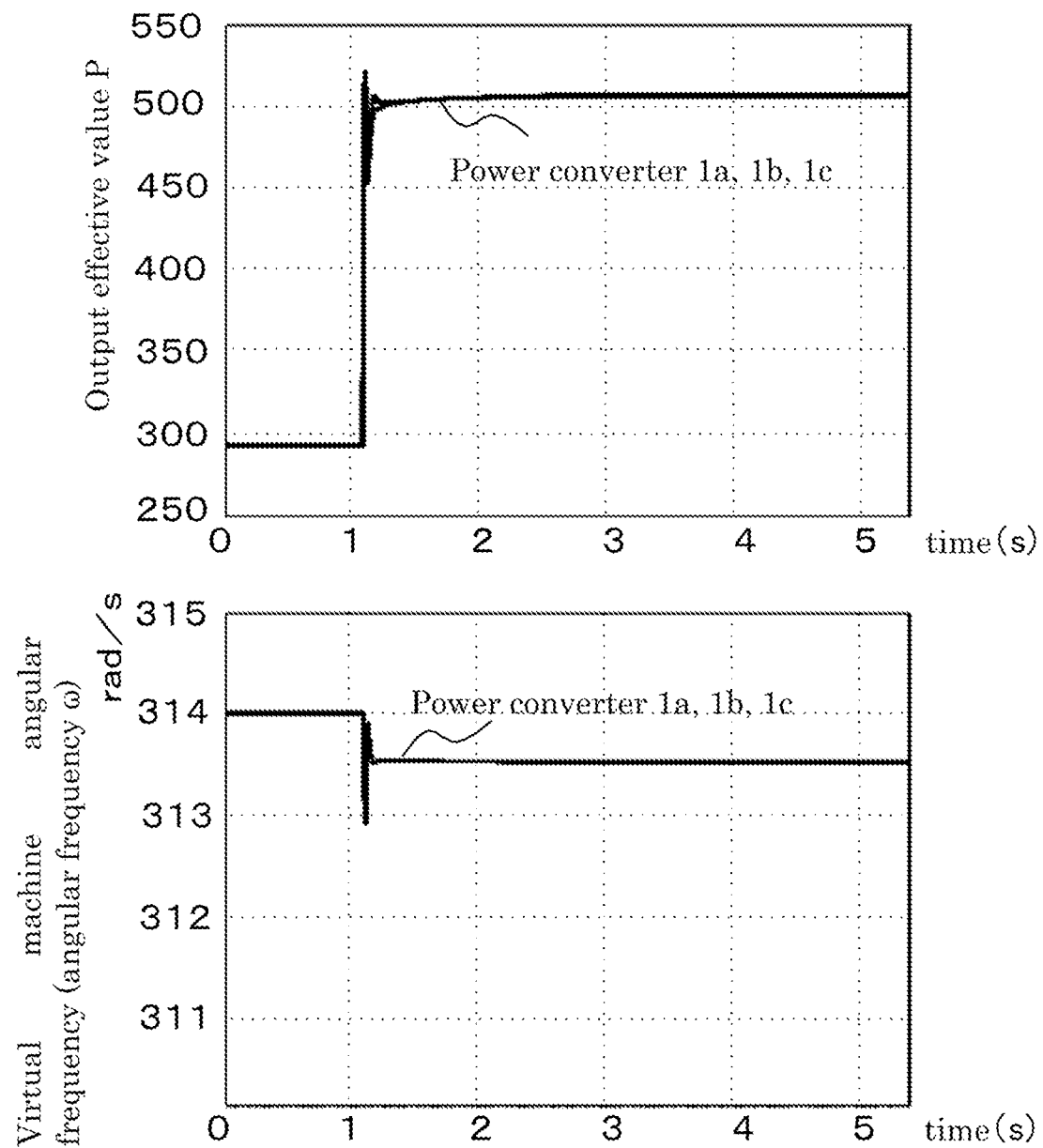
FIG. 15 is a diagram illustrating the output active power and the virtual machine angular frequency of the power converter according to the other embodiment.

The change in the virtual machine angular frequency (angular frequency ω) and virtual machine angular frequency (angular frequency ω) of the power converter 1 are as shown in FIG. 14. The output active power P and the virtual machine angular frequency (angular frequency ω) of the power converter 1 are as shown in FIG. 15.

With this configuration, since the phase controller 20 of the power converter 1 calculates the phase angle reference value θm based on the control amount for proportional control based on the difference between the active power reference value Pe and the output active power P, the phase angle reference value θm can be rapidly after load fluctuated. Accordingly, the oscillation of the electric power output from the power converter 1 is suppressed. As a result, the cross current is reduced. Further, with such a configuration, the phase controller 20 does not have the first-order lag controller 22, and the number of control blocks can be reduced. Thereby, it is possible to provide the power converter 1 having a simple configuration.

(2) According to the above embodiment, in the power conversion system 100, three inverter-based power sources 6 are connected to the distribution line 5, however the number of inverter-based power source 6 connected to the distribution line 5 is not limited to this. The number of the inverter-based power source 6 connected to the distribution line 5 may be two or four or more. Further, power generation facilities such as the thermal power plant, the hydraulic power plant, and the nuclear power plant may be connected to the distribution line 5.

(3) According to the above embodiment, the power source 60 of the inverter-based power source 6 is composed of a renewable energy power source such as a solar power generation facility or a wind power generation facility, however the power source 60 is not limited to this. The power source 60 may be a fuel cell, a device that generates power by geothermal power generation, or the like.

REFERENCE SIGNS LIST

1 Power converter
2 Utility grid
3 Circuit breaker
4 EMS
5 Distribution line
6,6a,6b,6c Inverter-based power source
7,7a,7b,7c Step-up transformer
8 Communication line
9,9a,9b,9c Load
10 Voltage controller
11,21,31,37,38 Subtracter
12,22,32 First-order lag controller
13 PI controller
14 dq/abc converter
15 abc/dq converter
20 Phase controller
23,33 Adder
24,34 Integrator
25,35 Proportional controller
30 Phase controller
36 Multiplier
52 Power conversion unit
53 Voltage current meter
54 Controller
55 Gate pulse generator
60 Power source
61 Voltage meter
100 Power conversion system

The invention claimed is:

1. A power converter, comprising:
a phase controller calculating a phase angle reference value based on a difference between a commanded active power reference value and an output active power supplied to a distribution line,
a voltage controller calculating a voltage reference value based on the phase angle reference value calculated by the phase controller, and,
a power conversion unit converting, based on the voltage reference value calculated by the voltage controller, an electric power supplied from a power supply source into AC power and outputs it to the distribution line,
wherein the phase controller adds a control amount for proportional control based on a difference between the active power reference value and the output active power and a control amount by a first-order lag controller based on the difference between the active power reference value and the output active power to calculate the phase angle reference value.

2. A power converter, comprising:
a phase controller calculating a phase angle reference value based on a difference between a commanded active power reference value and an output active power supplied to a distribution line,
a voltage controller calculating a voltage reference value based on the phase angle reference value calculated by the phase controller, and,
a power conversion unit converting, based on the voltage reference value calculated by the voltage controller, an electric power supplied from a power supply source into AC power and outputs it to the distribution line,
wherein the phase controller adds a control amount for proportional control based on a difference between a phase angle difference reference value and a measured phase angle difference and a control amount by a first-order lag controller based on the difference between the active power reference value and the output active power to calculate the phase angle reference value.

3. The power converter according to claim 2, wherein:
the phase angle difference reference value is calculated based on the active power reference value, a reactance to the distribution line, and the output voltage effective value.

4. A power converter, comprising:
a phase controller calculating a phase angle reference value based on a difference between a commanded active power reference value and an output active power supplied to a distribution line,
a voltage controller calculating a voltage reference value based on the phase angle reference value calculated by the phase controller, and,
a power conversion unit converting, based on the voltage reference value calculated by the voltage controller, an electric power supplied from a power supply source into AC power and outputs it to the distribution line,
wherein the phase controller calculates the phase angle reference value based on a control amount for proportional control based on a difference between a phase angle difference reference value and a measured phase angle difference.

* * * * *